S. S. MORGAN.
WELDING TOOL.
APPLICATION FILED MAY 23, 1914.

1,109,591.

Patented Sept. 1, 1914.

WITNESSES:
C. L. Belcher
H. N. Hennessy

INVENTOR.
Samuel S. Morgan
BY F. H. Gibbs
ATTORNEY

UNITED STATES PATENT OFFICE.

SAMUEL S. MORGAN, OF ST. CHARLES, MISSOURI, ASSIGNOR TO AMERICAN CAR AND FOUNDRY COMPANY, OF ST. LOUIS, MISSOURI, A CORPORATION OF NEW JERSEY.

WELDING-TOOL.

1,109,591. Specification of Letters Patent. Patented Sept. 1, 1914.

Application filed May 23, 1914. Serial No. 840,542.

*To all whom it may concern:*

Be it known that I, SAMUEL S. MORGAN, residing at St. Charles, Missouri, and being a citizen of the United States, have invented certain new and useful Improvements in Welding-Tools, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

Figure 1:
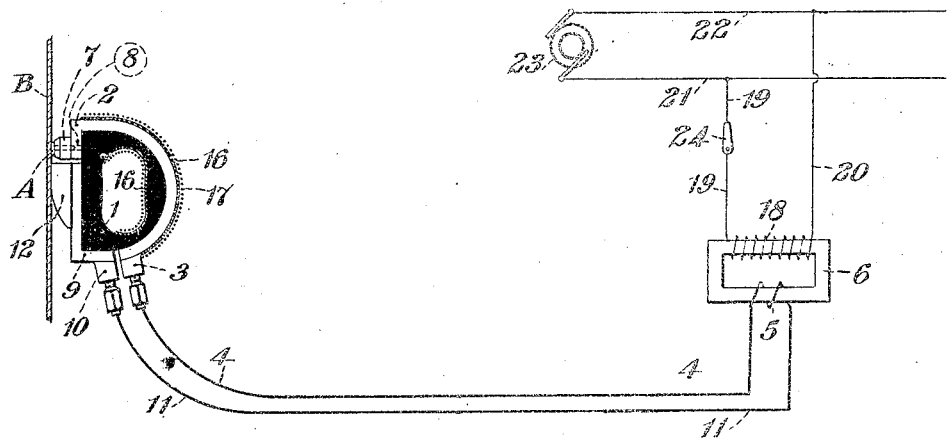
Figure 3:
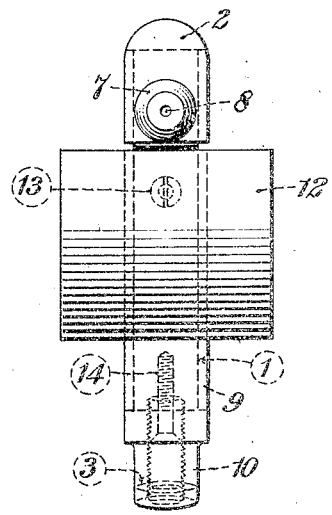
Figure 2:
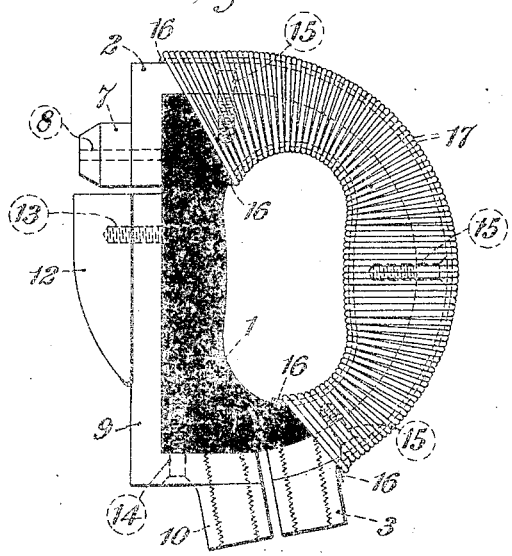

In said drawings Figure 1 is a diagrammatic view disclosing the improved welding tool in condition to weld the nail to the sheet. Fig. 2 is a side elevation of the welding tool. Fig. 3 is an end elevation thereof.

In some classes of work, it is necessary to affix to bodies of extensive dimensions multitudinous associated parts of small size, the process being long, arduous and costly, unless means be provided to promote rapidity and simplicity of operation. An example of the above conditions is the attachment to the walls of a railroad car of clips for securing in place temperature insulation, and, as the insulation and the walls are substantially co-extensive with each other and the points of attachment relatively close, it is not difficult to appreciate that great numbers of clips are used on the walls of a single car.

The advent of the steel car permits the use of welding and the present invention has to do with welding apparatus having a portable welding tool adapted to apply to the metallic walls or sheathing of such car, the clips above referred to, and other small fixtures as well.

One object of the present invention is to provide a welding tool of such construction that no particular adjustment of parts except its initial assembling is necessary to place it in condition for use, and which will be in condition to repeat the welding operations as rapidly as the action of the electric current and the reinsertion of new work will permit. And, to this end, means have been provided for the quick insertion of new work and an unhindered removal of the tool after such work has been properly affixed to a structure intended to carry it.

Another object is to so form the welding tool that it will be independent of electric switches or other associated circuit-closing apparatus, and will itself constitute a circuit maker and breaker.

To render it easily portable, and also inexpensive to construct, the tool is of very simple design and includes no heavy parts, is adequately strong, and is without movable mechanisms, which might become deranged and temporarily, at least, put it out of use.

Proper regard has been had for insulating the tool, so that it may be used with perfect safety, and its weight is so small that an operator can use it with one hand and make, if necessary or desirable, refined calculations in positioning it against a body.

Referring to the drawing, 1 indicates an insulating handle, of substantially D-shaped formation, though, obviously, its outline may vary widely from that shown. Fitted to the exterior and paralleling the curved portion of the handle and also the top horizontal edge and the upper part of the vertical straight outer edge, is a secondary terminal strap 2. At its lower extremity, the terminal strap 2 is provided with a socket 3, either integral with or secured thereto, adapted to receive and hold the terminal of a flexible conductor 4 connected with one side of a secondary winding 5 of a transformer 6, wound to adapt it to welding purposes. At the opposite end, strap 2 is provided with a work-holding welding electrode 7, preferably integral therewith, which contains a work-holding recess 8. This recess is formed in accordance with the type of work it is to hold, here being illustrated as a cylindrical aperture suited to receive an ordinary nail A. Another secondary terminal strap 9 is also fitted to handle 1, but in the form illustrated, it is of L-shaped outline and parallels the major portion of the straight vertical edge and the lower horizontal edge of said handle.

Strap 9 carries at its lower extremity a socket 10 similar to socket 3 of strap 2, both these sockets and the ends of the terminal straps from which they depend being in juxtaposition to each other, but separated by an air gap of such dimensions as will prevent a short circuit due to a jumping of the electric current from one to the other. To socket 10 is attached a flexible conductor 11 connected also to the secondary winding 5 of transformer 6. At the upper end of strap 9 is a welding electrode 12, which may be an integral extension of the strap, but is here shown as a removable piece. Electrode 12 is provided with a relatively broad external bearing surface, which extends laterally in opposite directions beyond either side of strap 9, said surface being preferably convex. With its top flush with the upper end of strap 9, and both the end of strap 9 and the top of electrode 12 separated from electrode 7 and the adjacent end of strap 2 by an air gap similar to and for the same purpose as the gap between sockets 3 and 10, electrode 12 extends downwardly a considerable distance. It is secured in place by any suitable means, as a screw 13, which, with its head well embedded in insulating handle 1, passes through said handle, strap 9 and into said electrode 12. The horizontal leg of terminal strap 9 is also secured to handle 1 by a screw 14, and terminal strap 2 is secured to the handle by a number of screws 15.

Most of terminal strap 2 and that part of the handle 1 against which it lies, and which constitutes the grip are incased within insulation 16, which in turn is wound with string 17, the latter protecting said insulation against accidental puncture or abrasion, and serving also to hold it firmly in place. Incasing insulation 16 is preferably asbestos, its properties allowing it to serve as a temperature insulator, in addition to its function as an electric insulator, and thus any discomfort to the operator's hand due to heat is avoided.

Transformer 6 has a primary winding 18, connected by conductors 19 and 20 across the line 21, 22, which is supplied with energy from an alternating current generator 23, a switch 24 being placed in conductor 19 to allow the transformer to be cut out, if desired.

To use the portable welding tool, switch 24 is first closed, establishing a primary circuit from generator 23, through line conductor 21, part of conductor 19, switch 24, the rest of conductor 19, primary winding 18, conductor 20, line conductor 22 to generator 23. The piece of work to be attached, as nail A, is then inserted into recess 8 of welding electrode 7, and the convex portion of the bearing surface of welding electrode 12 is placed in mechanical contact with the body, as sheet B, to which nail A is to be welded. The tool is thus inclined outwardly from sheet B, and nail A, carried by electrode 7, is out of electrical contact with said sheet. Pressure and motion suitably applied to handle 1 will cause the tool in its entirety to rock with electrode 12, until the head of nail A contacts with sheet B. A circuit is thereby established from the secondary winding 5 of the transformer 6 through conductor 4, socket 3, terminal strap 2, welding electrode 7, nail A, sheet B, welding electrode 12, terminal strap 9, socket 10, conductor 11 to secondary winding 5. As the primary circuit was initially closed, primary winding 18 induces a current in secondary winding 5, which traverses the circuit last traced, welding nail A to sheet B. After a proper interval, best determined by experience, the operator simply opens the switch 24 then withdraws the welding tool from sheet B, the nail A remaining attached to the latter. The electrodes of the primary and secondary being dead the tool may be removed and another nail may be quickly inserted and the tool applied in the same manner as before to another point on sheet B, the switch 24 is closed and the secondary circuit becomes instantly reestablished as the new nail A contacts with sheet B.

What I claim is:

1. In a welding apparatus, a welding tool comprising welding electrodes in a normally open circuit, one electrode being adapted to initially mechanically contact with work and the other to carry additional work, means for simultaneously moving both electrodes to cause an electrical contact between said first and second mentioned work, and a source of electrical energy in said circuit.

2. In welding apparatus, a welding tool comprising an insulating supporting structure, welding electrodes in fixed relation secured thereto, one electrode adapted to initially mechanically contact with work and the other electrode adapted to hold additional work, the first mentioned electrode adapted to have subsequent movement with respect to said first mentioned work to actuate the other electrode to carry said additional work into mechanical and electrical contact with said first-mentioned work, and means for electrifying both electrodes.

3. In welding apparatus, a welding tool comprising an insulating supporting structure, a welding electrode affixed thereto adapted to initially mechanically contact with work and permit said structure to move toward or from said work, another welding electrode affixed to said structure adapted to hold other work, and upon movement of said structure to carry the latter work into electrical contact with said first mentioned work, and means for electrifying both electrodes.

4. In welding apparatus, a welding transformer having primary and secondary windings, the former in a normally closed circuit including a source of energy and a switch and the latter in a normally open circuit with welding electrodes, an insulating structure with a gripping portion supporting said electrodes, one electrode being adapted to initially mechanically contact with work and the other to carry additional work, said structure being adapted to be rocked with the first mentioned electrode to carry said additional work into electrical contact with said first-mentioned work.

5. A portable welding tool comprising an insulating supporting structure having a handle portion, separated current-conducting terminal pieces attached thereto, a welding electrode secured to each terminal piece, one being rockable and the other adapted to hold work, and means for connecting an electrical conductor to each terminal piece.

6. A portable welding tool comprising an insulating operating handle, current-conducting terminal straps conforming and secured to said handle, a welding electrode secured to each strap, one being rockable and the other adapted to hold work, means for connecting each of said straps to a flexible electrical conductor, and an insulating covering for the gripping portion of said handle.

7. A portable welding tool comprising an operating handle of insulating material, separated current-conducting terminal straps conforming and secured to said handle, a welding electrode secured to each strap, one being rockable in a single direction but restrained from rocking in other directions, the other electrode being adapted to carry work, means for connecting each of said straps to a flexible electrical conductor, and an insulating sheathing for said handle.

8. A portable welding tool comprising an apertured operating handle of insulating material, separated current-conducting terminal straps conforming and secured to said handle, spaced welding electrodes secured to said straps, one electrode being rockable in a predetermined manner and formed to be restrained from other rocking and the other electrode being shaped to hold work, means for including said straps in an energizable electric circuit and a temperature and current insulating covering for said handle.

9. A portable welding tool comprising a D-shaped handle of insulating material, separated current-conducting terminal straps secured to said handle, spaced welding electrodes secured to said straps, one electrode having a convex rocking surface broader than said handle and the other electrode being formed to embrace and hold work, spaced sockets on said straps each adapted to inclose and hold a flexible electrical conductor, a temperature and current-insulating covering for a portion of said handle and a wrapping for said covering.

10. In a welding tool, welding electrodes held in fixed relation to each other, one adapted to initially contact with work and the other to hold additional work, and means for simultaneously actuating both electrodes to bring the distinct pieces of work into mechanical and electrical contact.

11. In a welding tool, an insulating supporting structure, separated removable current-conducting terminal pieces attached thereto, welding electrodes secured to said pieces, one being rockable and removable and the other adapted to hold work, and means for including the current-conducting pieces in an electric circuit.

12. In a device of the character described, an operating handle of insulating material, current conducting terminal pieces secured thereto and separated by air gaps, rocking and work-holding electrodes secured to said terminal pieces, means for connecting electrical conductors to the latter, an insulating sheathing for said handle and a terminal piece, and a protective cover for said sheathing.

13. A circuit making and breaking portable welding tool comprising an insulating supporting structure, current conducting terminal pieces secured thereto and insulated from each other, a welding electrode secured to each terminal piece, one adapted to hold work and the other adapted to initially mechanically contact with other work and to be rocked thereon to cause said first mentioned work to make electrical contact with said second mentioned work, and means for electrifying both electrodes, said tool adapted to be withdrawn from both pieces of work.

14. In welding apparatus, a welding tool comprising welding electrodes in a normally open circuit, one electrode being adapted to initially mechanically contact with work and the other to carry additional work, means for simultaneously moving both electrodes to cause the making of an electrical contact between said first and second mentioned work, a source of electrical energy in said circuit, and means other than said tool for rendering the circuit dead.

15. In welding apparatus, a welding transformer provided with primary and secondary windings, the former in circuit with a source of electrical energy and the latter in normally open circuit with a welding tool comprising welding electrodes, one electrode adapted to initially mechanically contact with work and the other to carry additional work, and means for simultaneously moving both electrodes to cause an electrical contact between said first and second mentioned work, and an independent circuit breaker for rendering the transformer ineffective.

In witness whereof I have hereunto set my hand in the presence of two witnesses.

SAMUEL S. MORGAN.

Witnesses:
T. H. GIBBS,
L. T. CARROLL.